United States Patent
Onoda et al.

(10) Patent No.: US 10,218,712 B2
(45) Date of Patent: Feb. 26, 2019

(54) ACCESS CONTROL USING INFORMATION ON DEVICES AND ACCESS LOCATIONS

(71) Applicant: International Business Machines Corporation, Armonk, NY (US)

(72) Inventors: Yasuhiro Onoda, Yokohama (JP); Hironori Yuasa, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 87 days.

(21) Appl. No.: 15/414,977

(22) Filed: Jan. 25, 2017

(65) Prior Publication Data
US 2018/0212974 A1 Jul. 26, 2018

(51) Int. Cl.
*H04L 12/26* (2006.01)
*H04L 29/06* (2006.01)
*H04L 29/12* (2006.01)
*H04L 12/24* (2006.01)

(52) U.S. Cl.
CPC ............ *H04L 63/107* (2013.01); *H04L 41/28* (2013.01); *H04L 43/08* (2013.01); *H04L 61/103* (2013.01); *H04L 61/6022* (2013.01); *H04L 63/0876* (2013.01); *H04L 61/2015* (2013.01); *H04L 2463/121* (2013.01)

(58) Field of Classification Search
CPC . H04L 63/107; H04L 61/103; H04L 61/6022; H04L 41/28; H04L 43/08; H04L 63/0876; H04L 61/2015; H04L 2463/121; H04L 63/08; H04L 63/162
See application file for complete search history.

(56) References Cited

U.S. PATENT DOCUMENTS

| | | | | |
|---|---|---|---|---|
| 5,835,720 A | * | 11/1998 | Nelson | H04L 29/12009 709/224 |
| 5,889,777 A | * | 3/1999 | Miyao | H04L 12/4608 370/395.52 |
| 6,189,102 B1 | * | 2/2001 | Beser | H04L 61/2015 709/201 |
| 6,532,435 B1 | * | 3/2003 | Aoshika | G06Q 20/10 370/254 |
| 8,107,396 B1 | * | 1/2012 | Sharma | H04L 61/103 370/254 |
| 8,528,071 B1 | * | 9/2013 | Kwan | H04L 63/0876 726/14 |
| 8,549,584 B2 | * | 10/2013 | Singh | H04L 63/102 713/182 |

(Continued)

OTHER PUBLICATIONS

Moon, D., Lee, J.D., Jeong, YS. 2016, Journal of Supercomputing 72: 1740.*

*Primary Examiner* — Farid Homayounmehr
*Assistant Examiner* — Zhimei Zhu
(74) *Attorney, Agent, or Firm* — Brown & Michaels, PC; David Woycechowsky

(57) ABSTRACT

Access control within a network is established by combining multiple factors to prevent unauthorized access to a computer and/or network target system. The factors which may be combined are selected from a combination of three main factors confirmation that the accessing device which is attempting access is by an authorized user; the access request is made by a device that corresponds to an authorized degree of importance; and the accessing device is connected from a network that corresponds to the authorized degree of importance.

18 Claims, 12 Drawing Sheets

(56) References Cited

U.S. PATENT DOCUMENTS

| | | | | |
|---|---|---|---|---|
| 9,787,498 B2* | 10/2017 | Kuo | ............... | H04N 5/23206 |
| 2002/0016858 A1* | 2/2002 | Sawada | ............ | H04L 29/12018 |
| | | | | 709/238 |
| 2004/0059909 A1* | 3/2004 | Le Pennec | ............... | H04L 63/12 |
| | | | | 713/153 |
| 2005/0050357 A1* | 3/2005 | Jeng | ............... | H04L 41/12 |
| | | | | 726/4 |
| 2005/0114507 A1* | 5/2005 | Tarui | ............... | H04L 29/12264 |
| | | | | 709/224 |
| 2005/0122921 A1* | 6/2005 | Seo | ............... | H04W 48/16 |
| | | | | 370/310 |
| 2006/0143309 A1* | 6/2006 | McGee | ............... | H04L 43/0811 |
| | | | | 709/250 |
| 2007/0014232 A1* | 1/2007 | Yasuie | ............... | H04L 43/0811 |
| | | | | 370/216 |
| 2007/0070998 A1* | 3/2007 | Sethuram | ............... | H04L 12/12 |
| | | | | 370/389 |
| 2007/0097919 A1* | 5/2007 | Tsubota | ............ | H04L 29/12028 |
| | | | | 370/331 |
| 2007/0162954 A1* | 7/2007 | Pela | ............... | G06F 21/31 |
| | | | | 726/2 |
| 2007/0250518 A1* | 10/2007 | Chu | ............... | H04L 29/12028 |
| 2009/0268681 A1* | 10/2009 | Lin | ............... | H04L 29/12028 |
| | | | | 370/329 |
| 2009/0307753 A1 | 12/2009 | Dupont et al. | | |
| 2010/0122320 A1* | 5/2010 | Merati | ............... | H04L 9/006 |
| | | | | 726/3 |
| 2010/0325730 A1* | 12/2010 | Cyprus | ............... | H04L 63/0209 |
| | | | | 726/25 |
| 2010/0333177 A1* | 12/2010 | Donley | ............... | G06F 21/566 |
| | | | | 726/4 |
| 2011/0023087 A1* | 1/2011 | Aoki | ............... | H04L 63/08 |
| | | | | 726/3 |
| 2013/0027205 A1* | 1/2013 | Hansen | ............... | A61B 5/746 |
| | | | | 340/573.1 |
| 2013/0070639 A1* | 3/2013 | Demura | ............... | H04L 61/6086 |
| | | | | 370/254 |
| 2013/0246603 A1* | 9/2013 | Davis | ............... | H04L 29/12216 |
| | | | | 709/224 |
| 2014/0165162 A1 | 6/2014 | Black et al. | | |
| 2014/0297339 A1* | 10/2014 | Tanaka | ............... | G06Q 10/02 |
| | | | | 705/5 |
| 2015/0350043 A1* | 12/2015 | Kovacs | ............... | H04L 12/28 |
| | | | | 370/245 |
| 2016/0119284 A1* | 4/2016 | Kim | ............... | H04W 76/10 |
| | | | | 726/12 |
| 2017/0070412 A1* | 3/2017 | Kanevsky | ............... | H04L 43/10 |
| 2017/0180456 A1* | 6/2017 | Zhang | ............... | H04L 41/0806 |
| 2017/0310559 A1* | 10/2017 | Jain | ............... | H04L 41/26 |
| 2017/0359222 A1* | 12/2017 | Dutta | ............... | H04L 41/12 |
| 2018/0052945 A1* | 2/2018 | Avazpour | ............... | G06F 17/30991 |
| 2018/0205644 A1* | 7/2018 | Peng | ............... | H04L 45/586 |

* cited by examiner

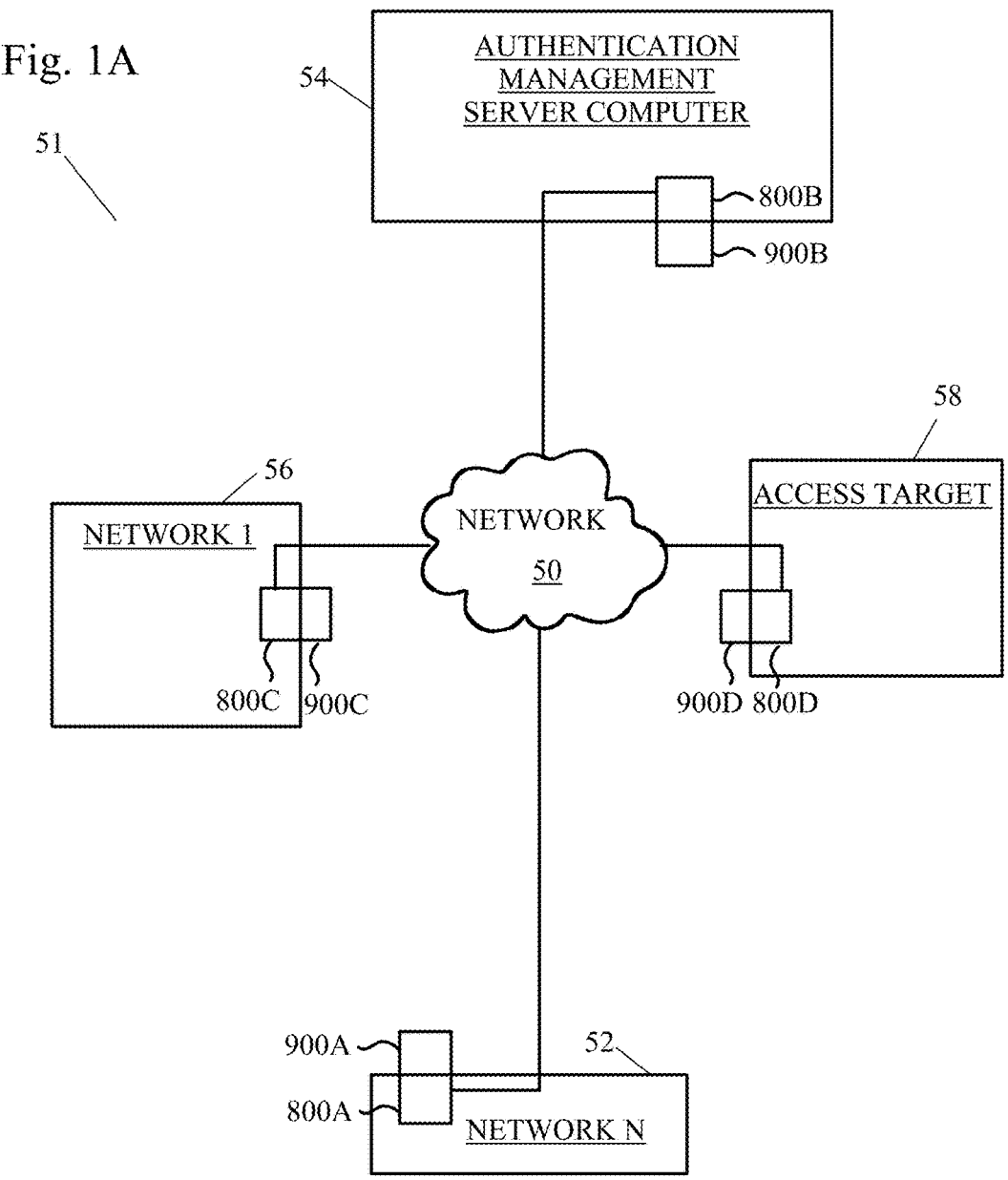

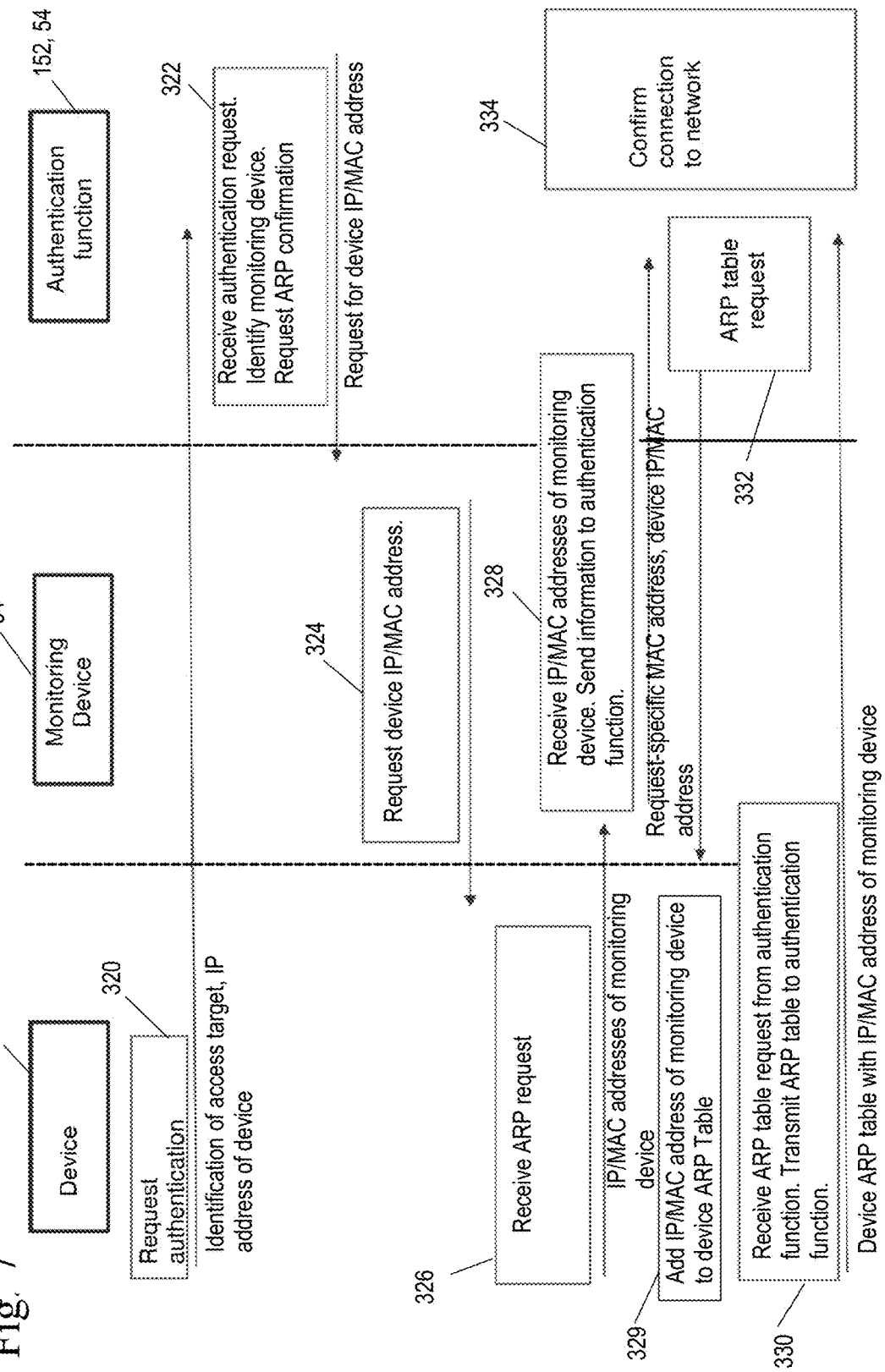

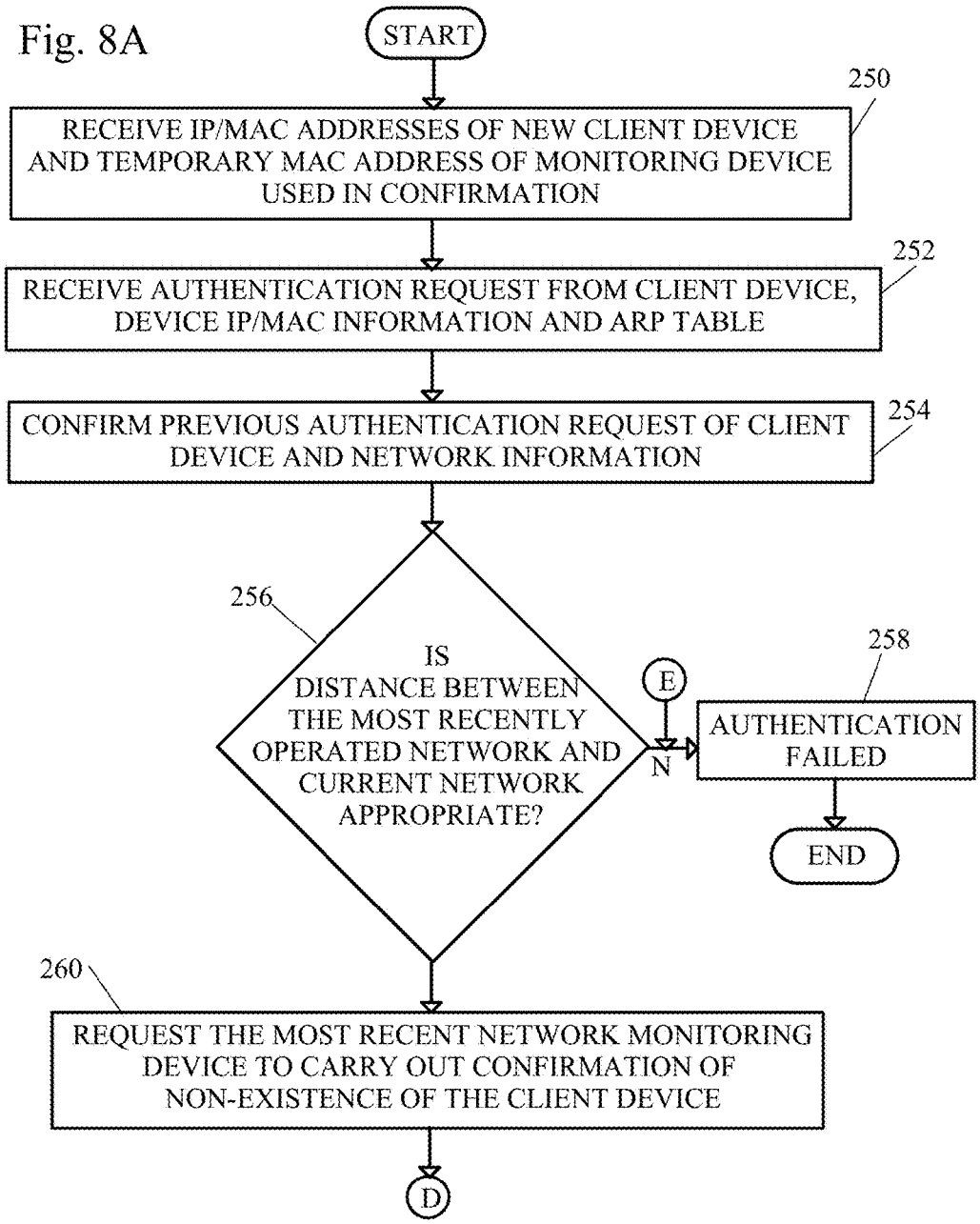

ACCESS CONTROL USING INFORMATION ON DEVICES AND ACCESS LOCATIONS

BACKGROUND

The present invention relates to network security, and more specifically to access control to a network using information on devices and access locations of the devices.

Traditional systems of various types are built on authorization schemes that are only based on whether or not a user is an authenticated, which is usually validated based on only a combination of user entered user id and password. As a result, if leakage of information necessary for authentication such as the user's password occurs, any party will be able to gain unauthorized access to a target system.

Some web systems use persistent or permanent cookies of browsers and provide warning of a connection having been made from a new environment. However, they do not provide forcible access rejection schemes. Also, the use of cookies implies that systems that do not involve browser-based application cannot incorporate this authorization methodology.

Even if an authenticated or valid user accesses the system, in some cases, the access of the user to the target system should be rejected. For example, when the authenticated user accesses a target system from a device that is not approved as an authorized device (e.g., a private device and/or shared ones with another person), when the authenticated user requests access from an approved device that resides in an environment with insufficient security level (e.g., access via a public Wi-Fi network), or when access to a target system is dependent on different security levels which is specified by devices, such as PCs and smartphones or operating systems such as Microsoft Windows, Mac OS X, and Linux.

SUMMARY

According to one embodiment of the present invention a method of authenticating a client device of a network for access to an access target with an authentication computer is disclosed. The method comprising the steps of: the authentication computer receiving a request for authentication from a client device of a network; the authentication computer identifying a monitoring device on the network of the client device based on an IP address of the client device within the request for authentication; the authentication computer requesting an address resolution protocol confirmation through the monitoring device with a specific MAC address associated with the address resolution protocol on the network to request the client device's IP address; the authentication computer receiving, from the client device, the specific MAC address associated with the monitoring device and the client device's IP address and MAC address; the authentication computer requesting an address resolution protocol table from the client device; the authentication computer receiving a device address resolution protocol table with IP address and MAC address of the monitoring device; the authentication computer comparing an established address resolution protocol table of the authentication computer to the device address resolution protocol table, MAC address of the monitoring device, specific request MAC address, IP address of the monitoring device of the client device, and IP address of the client device; and the authentication computer granting authentication of the client device when the device address resolution protocol table matches the established address resolution protocol table, the MAC address of the monitoring device, the specific request MAC address, the IP address of the monitoring device and the IP address of the client device.

According to another embodiment of the present invention, a computer program product for authenticating a client device of a network for access to an access target with an authentication computer is disclosed. The authentication computer comprising at least one processor, one or more memories, one or more computer readable storage media, the computer program product comprising a computer readable storage medium having program instructions embodied therewith. The program instructions executable by the computer to perform a method comprising: receiving, by the authentication computer, a request for authentication from a client device of a network; identifying, by the authentication computer, a monitoring device on the network of the client device based on an IP address of the client device within the request for authentication; requesting, by the authentication computer, an address resolution protocol confirmation through the monitoring device with a specific MAC address associated with the address resolution protocol on the network to request the client device's IP address; receiving, by the authentication computer, from the client device, the specific MAC address associated with the monitoring device and the client device's IP address and MAC address; requesting, by the authentication computer, an address resolution protocol table from the client device; receiving, by the authentication computer, a device address resolution protocol table with IP address and MAC address of the monitoring device; comparing, by the authentication computer, an established address resolution protocol table of the authentication computer to the device address resolution protocol table, MAC address of the monitoring device, specific request MAC address, IP address of the monitoring device of the client device, and IP address of the client device; and granting, by the authentication computer, authentication of the client device when the device address resolution protocol table matches the established address resolution protocol table, the MAC address of the monitoring device, the specific request MAC address, the IP address of the monitoring device and the IP address of the client device.

According to another embodiment of the present invention, a computer system for authenticating a client device of a network for access to an access target with an authentication computer is disclosed. The authentication computer comprising at least one processor, one or more memories, one or more computer readable storage media having program instructions executable by the computer to perform the program instructions comprising: receiving, by the authentication computer, a request for authentication from a client device of a network; identifying, by the authentication computer, a monitoring device on the network of the client device based on an IP address of the client device within the request for authentication; requesting, by the authentication computer, an address resolution protocol confirmation through the monitoring device with a specific MAC address associated with the address resolution protocol on the network to request the client device's IP address; receiving, by the authentication computer, from the client device, the specific MAC address associated with the monitoring device and the client device's IP address and MAC address; requesting, by the authentication computer, an address resolution protocol table from the client device; receiving, by the authentication computer, a device address resolution protocol table with IP address and MAC address of the monitoring device; comparing, by the authentication computer, an established address resolution protocol table of the authentication computer to the device address resolution protocol table, MAC address of the monitoring device, specific request MAC address, IP address of the monitoring device of the client device, and IP address of the client device; and granting, by the authentication computer, authentication of the client device when the device address resolution protocol table matches the established address resolution protocol table, the MAC address of the monitoring device, the specific request MAC address, the IP address of the monitoring device and the IP address of the client device.

BRIEF DESCRIPTION OF THE DRAWINGS

FIG. 1a depicts an exemplary diagram of a possible data processing environment in which illustrative embodiments may be implemented.

FIG. 1b shows components of networks of the data processing environment of FIG. 1a.

FIG. 1c shows components of the authentication management server computer of the data processing environment of FIG. 1a.

FIG. 7 shows a diagram of the requests and responses between the client workstation device, the monitoring device and the authentication server computer at the time of request when the client workstation device is confirmed.

FIGS. 8a-8b show a flow diagram of a method of the authentication management server confirming previous authentication of a client workstation device.

DETAILED DESCRIPTION

Figure 1B:
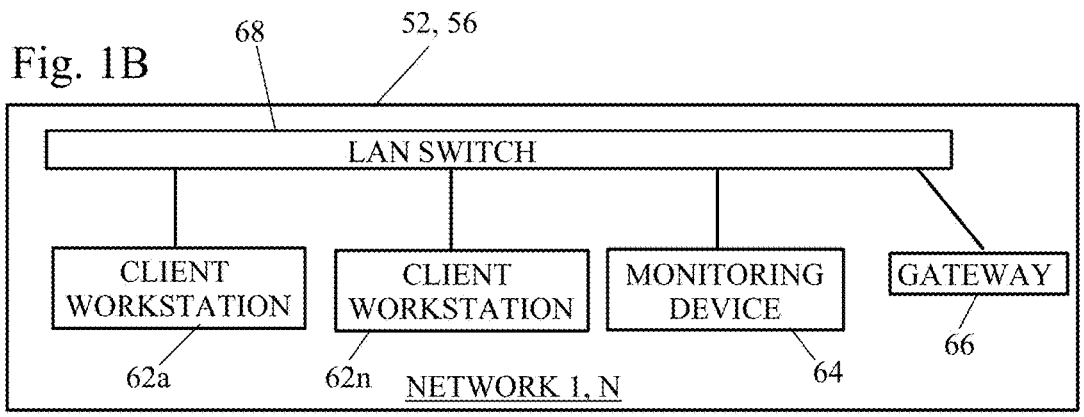
Figure 1C:
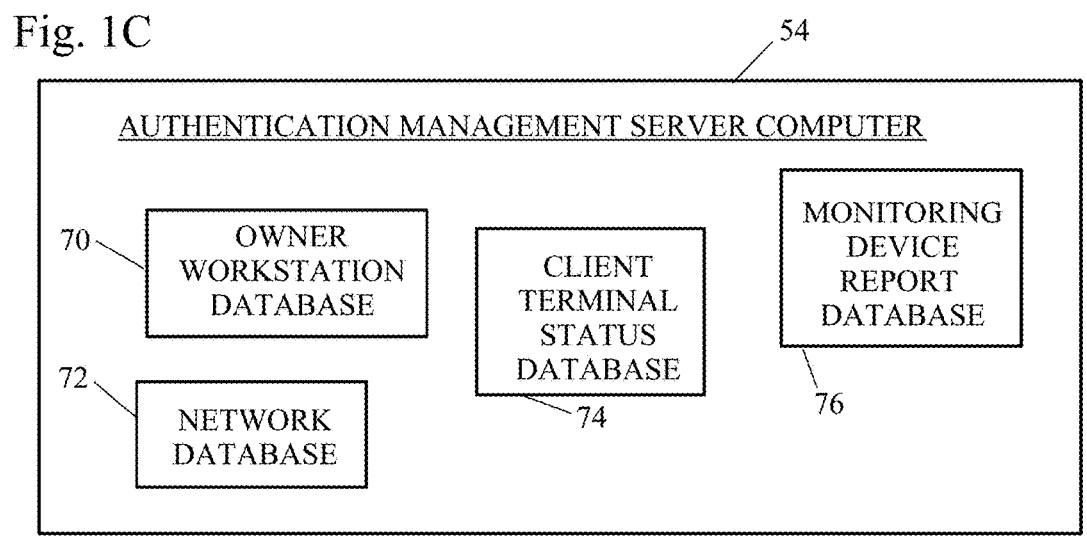

Embodiments of the present invention provide access control within a network by combining multiple factors to prevent unauthorized access to a computer and/or network target system. The factors which may be combined are selected from a combination of three main factors, as appropriate in accordance with the degree of importance specified. The importance may be based on a level of the connection destination and/or a level of content being accessed. The first factor is confirmation that the accessing device which is attempting access is by an authorized user. The second factor is that the access request is made by a device that corresponds to an authorized degree of importance. The third factor is that the accessing device is connected from a network that corresponds to the authorized degree of importance.

It will be recognized that embodiments of the present invention reduce the possibility of falsification of an authorized user and subsequent granted access without limiting the system to specific ranges of applications. For example, the present invention can be applied to any networking application system which requires additional secure authentication.

It will also be recognized in embodiments of the present invention that message authentication code (MAC) authentication is a substitute for user authentication. While MAC authentication is not robust in terms of the possibility of falsification, embodiments of the present invention use MAC addresses as only part of the information for confirmation of the device, which thereby lowers the possibility of falsification.

FIG. 1a depicts an exemplary diagram of a possible data processing environment in which illustrative embodiments may be implemented.

FIG. 1a is an exemplary diagram of a possible data processing environment provided in which illustrative embodiments may be implemented. It should be appreciated that FIG. 1a is only exemplary and is not intended to assert or imply any limitation with regard to the environments in which different embodiments may be implemented. Many modifications to the depicted environments may be made.

Referring to FIG. 1a, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, a first network 56, a second network 52, an access target 58, and an authentication management server computer 54 connect to network 50. In other exemplary embodiments, network data processing system 51 may include additional networks, client or device computers, storage devices or repositories, server computers, and other devices not shown. The access target 58 may be a network, a database, a computer or another device in which access is required. The intended targets of access control may be, but is not limited to: intranet, any other system, information sharing database and workflow, web system, host access, encrypted file, file server, network printer, or component as long as access can be made based on TCP/IP and they should be placed under the access control.

Figure 2:
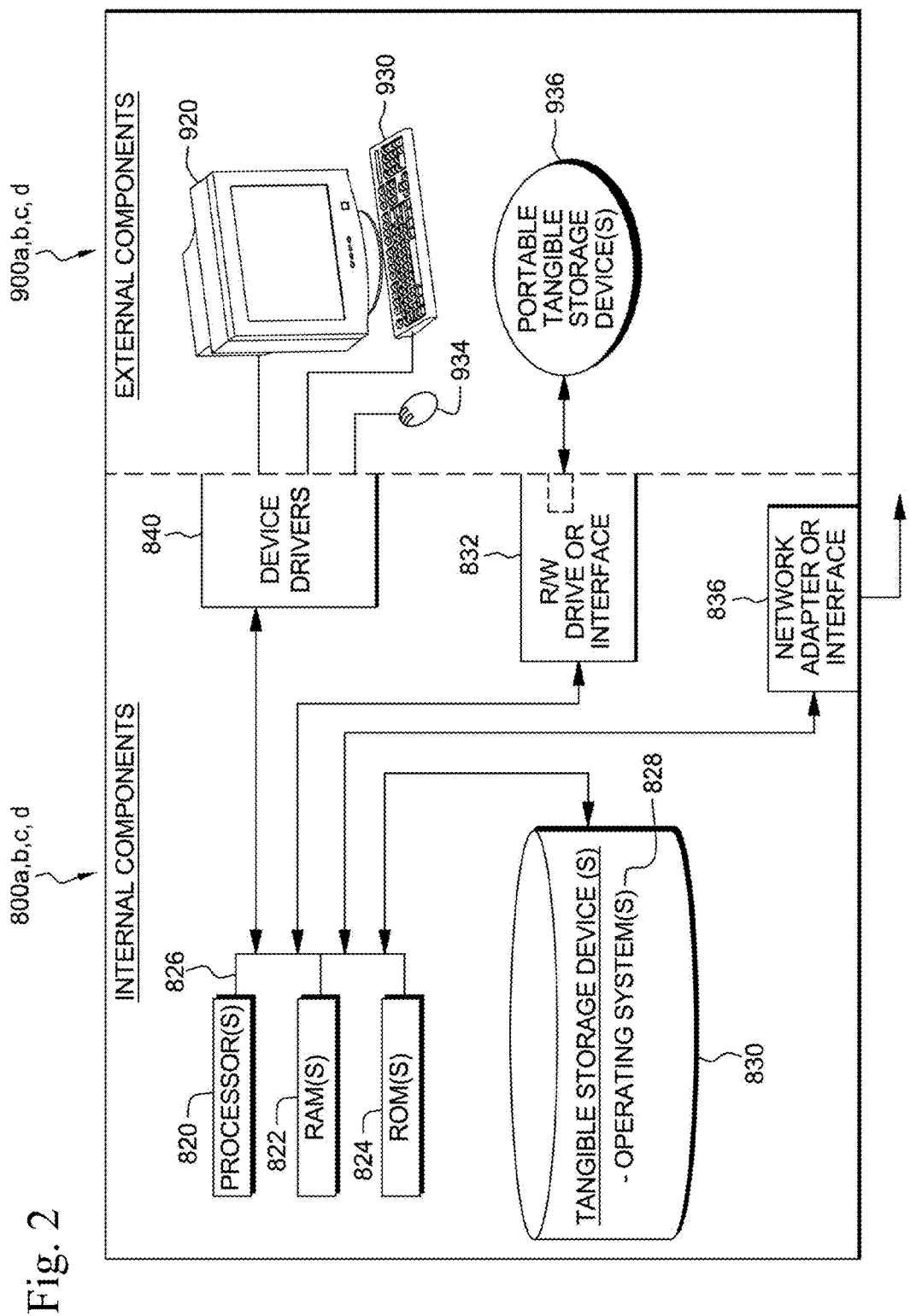
FIG. 2 illustrates internal and external components of components of the networks, authentication management server computer, and access target in which illustrative embodiments may be implemented.

Referring to FIG. 1b, an example of components of the networks 52, 56 is shown. The networks 52, 56 may include client workstations 62a-62n and a monitoring device 64 which are connected to a LAN switch 68. The LAN switch 68 is connected to the network 50 via a gateway (GW) 66. The client workstations 62a-62n may include a set of internal and external components 800c, 900c as shown in FIG. 2. The monitoring device 64 monitors for address resolution protocol (ARP) requests received from client workstations 62a-62n as well the MAC addresses.

It should be noted that while only two networks are shown, "n" networks may be part of the network data processing system 51.

The authentication management server computer 54 includes a set of internal components 800b and a set of external components 900b illustrated in FIG. 2. In the depicted example, authentication management server computer 54 provides information, such as boot files, operating system images, and applications to the devices of the networks 52, 56, as well as the access target 58. Authentication management server computer 54 can compute the information locally or extract the information from other computers on network 50. The authentication management server computer 54 preferably includes an owner workstation database 70, network database 72, client terminal status database 74, and a monitoring device report database 76. Pre-registration information may be stored in the owner workstation database 70, which preferably includes information regarding the users or owners of client workstations 62a-62n and MAC addresses. Pre-registration information may also be located in the network database 72, which preferably includes the network, the IP range, monitoring devices, and location. Status information may be stored in the monitoring device report database 76 and the client terminal status database 74. The monitoring device report database 76 preferably includes the network, report monitoring device temporary MAC address, monitoring device temporary MAC address, client IP, client MAC and report timestamp. The client terminal status database 74 preferably includes client MAC address, current IP address, current network, current login name, client terminal ARP, network participation time stamp, last access time stamp and last access report server. An example of the pre-registration information and status information is shown in Tables 1-7.

The access target 58 includes a set of internal components 800d, and a set of external components 900d illustrated in FIG. 2. In the depicted example, the access target 58 includes an access control list with information regarding target information, user, network, and access permission range. An example of an access control list is shown below in Table 8.

FIG. 2 illustrates internal and external components of network one 56, network n 52, access target 58, and authentication management server computer 54 in which illustrative embodiments may be implemented. In FIG. 2, network n 52, authentication management server computer 54, network one 56, and access target 58 include respective sets of internal components 800a, 800b, 800c, 800d and external components 900a, 900b, 900c, 900d. Furthermore, components of network one 56 or network n 52 contain internal components 800a, 800c, and external components 900a, 900c. Each of the sets of internal components 800a, 800b, 800c, 800d includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 are stored on one or more of the computer-readable tangible storage devices 830 for execution by one or more of the processors 820 via one or more of the RAMs 822 (which typically include cache memory). In the embodiment illustrated in FIG. 2, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b, 800c, 800d also includes a R/W drive or interface 832 to read from and write to one or more portable computer-readable tangible storage devices 936 such as a CD-ROM, DVD, memory stick, magnetic tape, magnetic disk, optical disk or semiconductor storage device.

Each set of internal components 800a, 800b, 800c, 800d also includes a network adapter or interface 836 such as a TCP/IP adapter card. Information can be downloaded to the devices of the network one 56 or network n 52 from an external computer via a network (for example, the Internet, a local area network or other, wide area network) and network adapter or interface 836. From the network adapter or interface 836, information can be loaded into hard drive 830. Information can also be downloaded to the authentication management server computer 54 from an external computer via a network (for example, the Internet, a local area network or other, wide area network) and network adapter or interface 836 or to devices of network n 52 or network one 56. The network may comprise copper wires, optical fibers, wireless transmission, routers, firewalls, switches, gateway computers and/or edge servers.

External components 900a, 900b, 900c, 900d of devices of network n 52, authentication management server 54, network one 56, and access target 58 can include a computer display monitor 920, a keyboard 930, and a computer mouse 934. Each of the sets of internal components 800a, 800b, 800c, 800d can include or have devices which also include device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Figure 3:
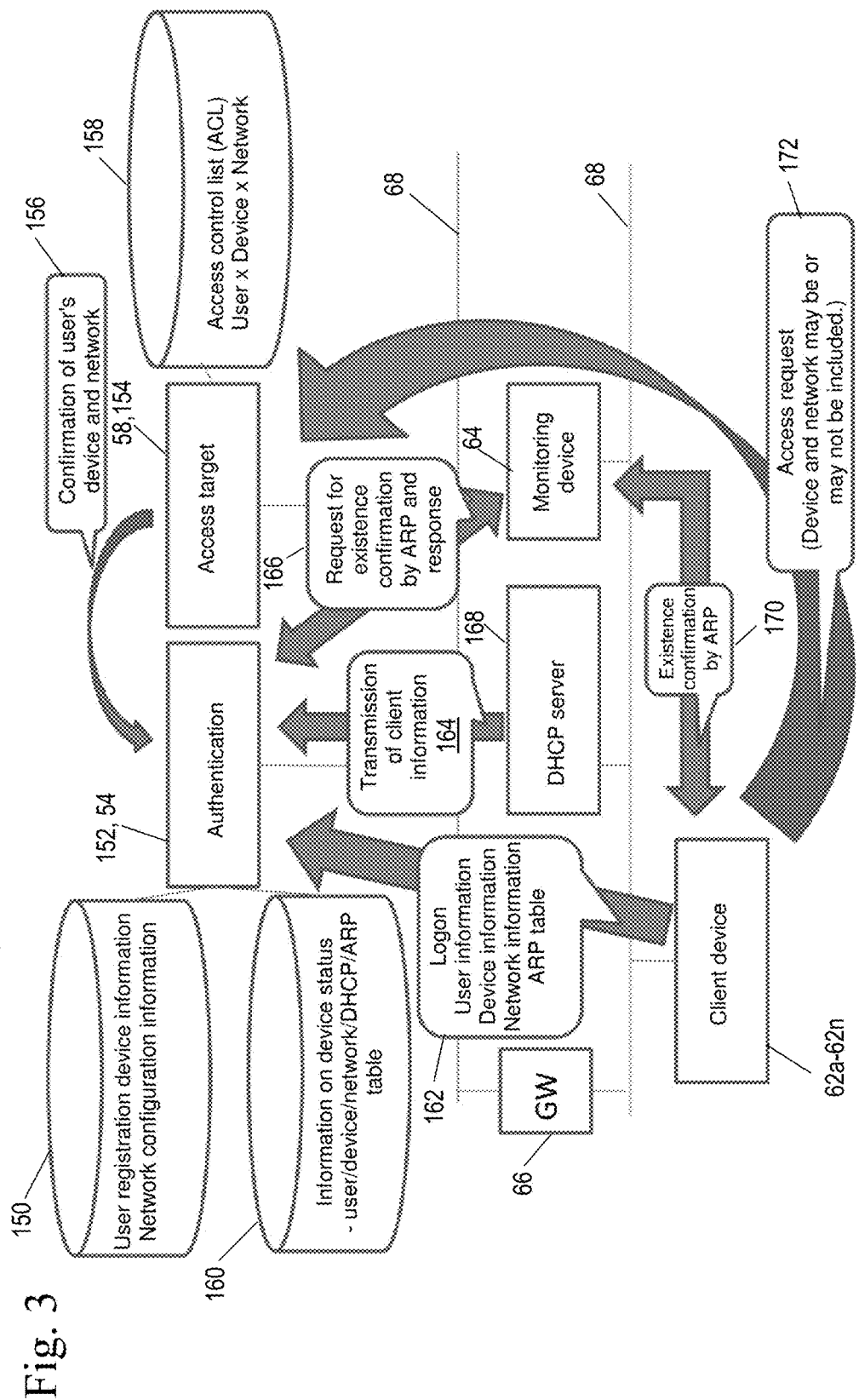
FIG. 3 shows an overall diagram of the authorization process of an embodiment of the present invention.

FIG. 3 shows an overall diagram of the authorization process of an embodiment of the present invention. The authorization process recognizes that the system-specific information (serial number, etc.) and the MAC address of the device owned by the user can be obtained and managed in advance. The authorization process also recognizes that the IP/MAC addresses of network devices such as gateways and the like are properly managed, and sub-networks are properly designed. Furthermore, the network is divided into sub-networks such that the division corresponds to the levels required in management in terms of business facilities, floors, and security levels.

An existence of a client device or workstation 62a-62n is confirmed by an address resolution protocol (ARP) request through a monitoring device 64. The ARP request is made by a monitoring device in the same network to confirm that there is a response from a device having the expected MAC address, and that the IP/MAC addresses of the ARP request-side device is correctly registered in the ARP table on the side of the device. ARP is a protocol used to obtain a MAC address from an IP address within the same segment. For responding to the ARP request, the request-side IP-MAC addresses are also registered in the target-side ARP table.

The monitoring device 64 transmits a request for existence confirmation by the authentication management server 54 which has an authentication function 154 and the access target 58 with an access target control list 158. At the time of authentication and/or authorization, a MAC address for the client device 62a-62n is transmitted along with the system-specific information such as a serial number of the device 62a-62n. It should be noted that this information is registered prior to the transmission. Additionally, system specific information is also transmitted, since the MAC address is public information available on the network and can be spoofed. In a Windows environment, the serial number, and other information can be obtained by Windows Management Instrumentation (WMI). Furthermore, the network information from the gateway (GW) 66 of the network the client device 62a-62n is connected to may be sent 172. The network information may include TCP/IP connection and network information held by the device 62a-62n and other information, such as the IP address on the side of the device 62a-62n which can be automatically obtained. Therefore, at the time of authentication and/or authorization, the MAC address of the client device, IP and MAC addresses of the default gateway and an ARP table of devices are transmitted 162 to an authentication management server 54. The ARP confirms the existence of the device 62a-62n.

With regard to the timing of the ARP request from the monitoring device, the following timings may be contemplated: at the time of the device having been connected to the network, when the ARP request flows in the network but no response is made thereto (when the device is being connected to the network, the device issues an ARP request for its own IP address to check whether or not there is any overlapping IP address); and when a request is made from the authentication and/or authorization server to the monitoring device.

A fixed value or any value specific to the request may be specified to the MAC address of the ARP request from the monitoring device. By virtue of this, the possibility of spoofing of the ARP table is reduced.

Confirmation by ARP is also used in the confirmation of absence of the device.

The same MAC addresses can simultaneously exist in two or more networks in an unauthorized state. In such a case, confirmation is requested by the authentication and/or authorization management server 54 for the individual monitoring devices to check whether the device in question has been moved from one network to another or it is in fact an unauthorized overlapping.

The access target 58, 154 confirms the users of the device and the network through an access control list 158. The access target 58, 154 sends the confirmation 156 to the authentication management server 54 and the monitoring device 64 for access to the target 154. A user logon with other information such as user information, device information, network information, MAC address and an access permission table 162 is passed through the gateway 66 to an authentication management server 54 via a DHCP server 168, if present.

In the case where a DHCP server 168 is present, the fact that the device's IP address, the IP address of the default GW 66, and the IP address of a DNS server are issued for the presented MAC address is checked by comparison with the information from the DHCP server 168. The DHCP server 168 sends the client information 164 to the authentication management server 54 for authentication 152. It is confirmed whether or not the MAC address of the default GW is correct. It is also confirmed whether or not the ARP table presented by the device is consistent with the ARP tables of other devices on the same network. The existence of the device is also confirmed by ARP 170.

The authentication server 54 can authenticate the information received from the client workstations 62a-62n, the access target 154 and monitoring device 64 by comparing data to user registration, device information, and network configuration information stored in a database 150 as well as information regarding the device status 160. Access levels can be specified on a per device basis as present in an address resolution protocol table. Therefore, authorization is determined by combining the information from the devices of the same network with ARP information.

According to the authentication function 152, it is confirmed whether or not the user is an authenticated user and the device used by this user is the authenticated one and it is also confirmed which network this device is connected to. The authentication function 152 also confirms that the device's MAC address really exists in the presented network as well as whether the MAC address does not exist in other networks.

It should be noted that even when there is no overlapping address, movement of a MAC address between networks is not unrealistically fast. The time required for physical movement in the network (between sub-networks) is identified in advance so that any identified movement taking place within a time less than the identified time is regarded as unauthorized. Which one (or both) of the addresses in question should be regarded as unauthorized may be specified by the policy.

Furthermore, according to the authentication function 152, accesses are controlled on the basis of the combination of the users and the networks that have been confirmed by the authentication function. For example, within a business facility, read and write are possible in a security area of the facility, but only a read function is allowed in the general area, while no access is allowed in other business facilities.

Once a MAC address of a device has been authenticated and preregistered, access of the device to the target 154 can be granted.

Figure 4:
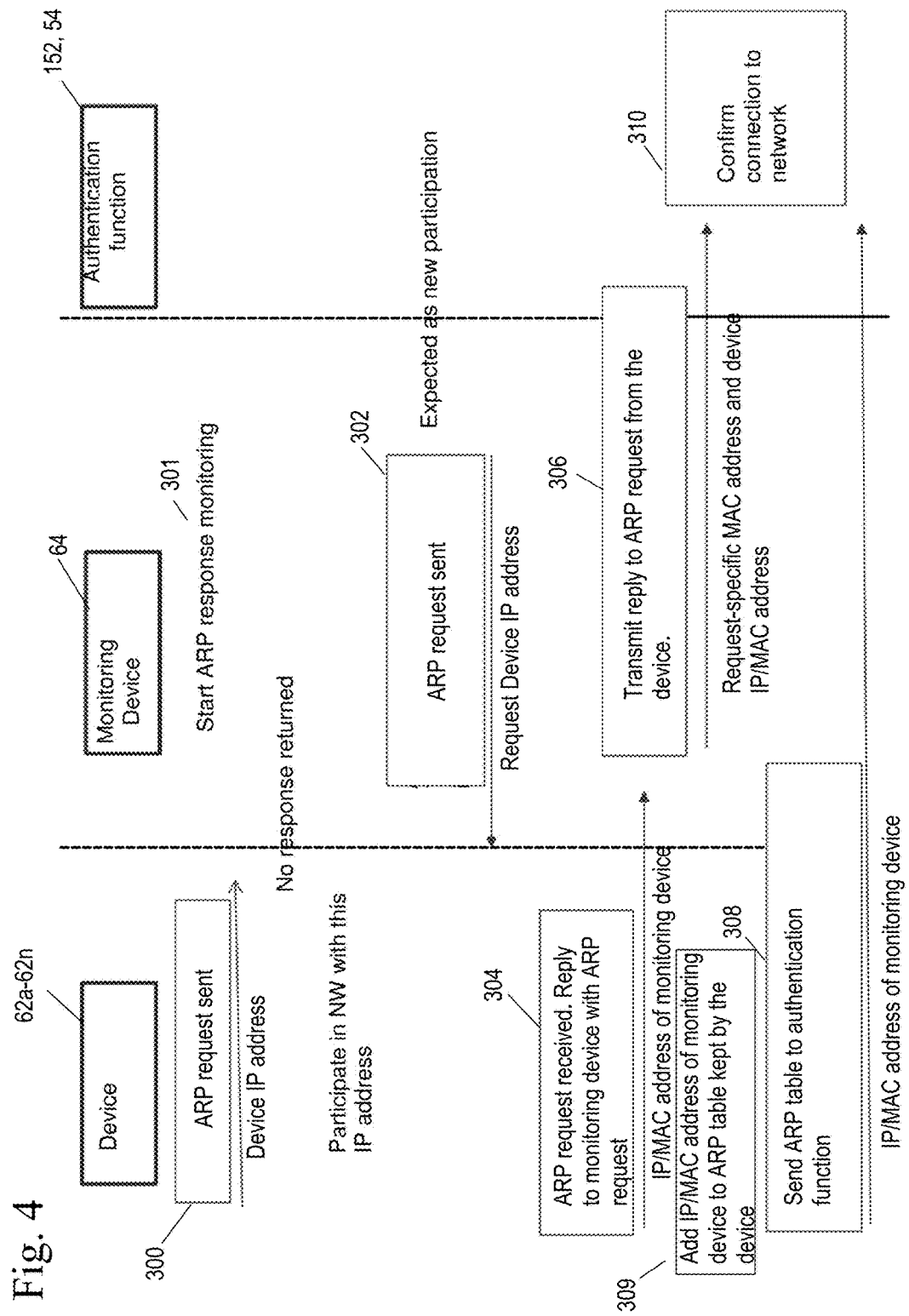
FIG. 4 shows a diagram of the requests and responses between the client workstation device, the monitoring device and the authentication server computer during initial confirmation of the device by the address resolution protocol.

FIG. 4 shows a diagram of the requests and responses sent and received by a client device and the monitoring device on the network, and an authentication function of the authentication management server 54 when confirming the existence of the client device 62a-62n through an address resolution protocol (ARP) at an initial stage. It should be noted that a database of the MAC addresses of the gateways (GWs) of the networks is created prior to the authentication and/or authorization shown in FIG. 4.

The device 62a-62n sends an address resolution protocol (ARP) request with its own IP address 300 to the monitoring device 64. The IP address sent by the device is the IP address to be used to access and participate with the network. The monitoring device 64 starts address resolution protocol response monitoring 301 and no response is returned to the device 62a-62n. The monitoring device 64 sends an ARP request 302 to the device 62a-62n for the device's IP address and the transmission source MAC address, which is request specific, as the device 62a-62n is expected to be a new participant for authentication and monitoring. The device 62a-62n replies to the ARP request 304 and sends the IP/MAC address of the monitoring device to the monitoring device 64. The specific requested specific MAC address and the device's IP/MAC addresses received 306 from the monitoring device are then sent 308 to the authentication function 152 of the authentication management server computer 54.

The device 62a-62n adds the IP/MAC address or the monitoring device 64 to a device kept ARP table 309. The ARP table includes the IP/MAC addresses of the surveillance or monitoring device 64 for use in authentication to be sent to the authentication management server computer 54 for authentication when requested. The authentication function 152 of the authentication management server computer 54 confirms the connection of the device 62a-62n to the network through the specific MAC address and device's IP/MAC addresses received from the monitoring device 64 and the ARP table including the address of the monitoring device 64 for authentication purposes 310.

Figure 5:
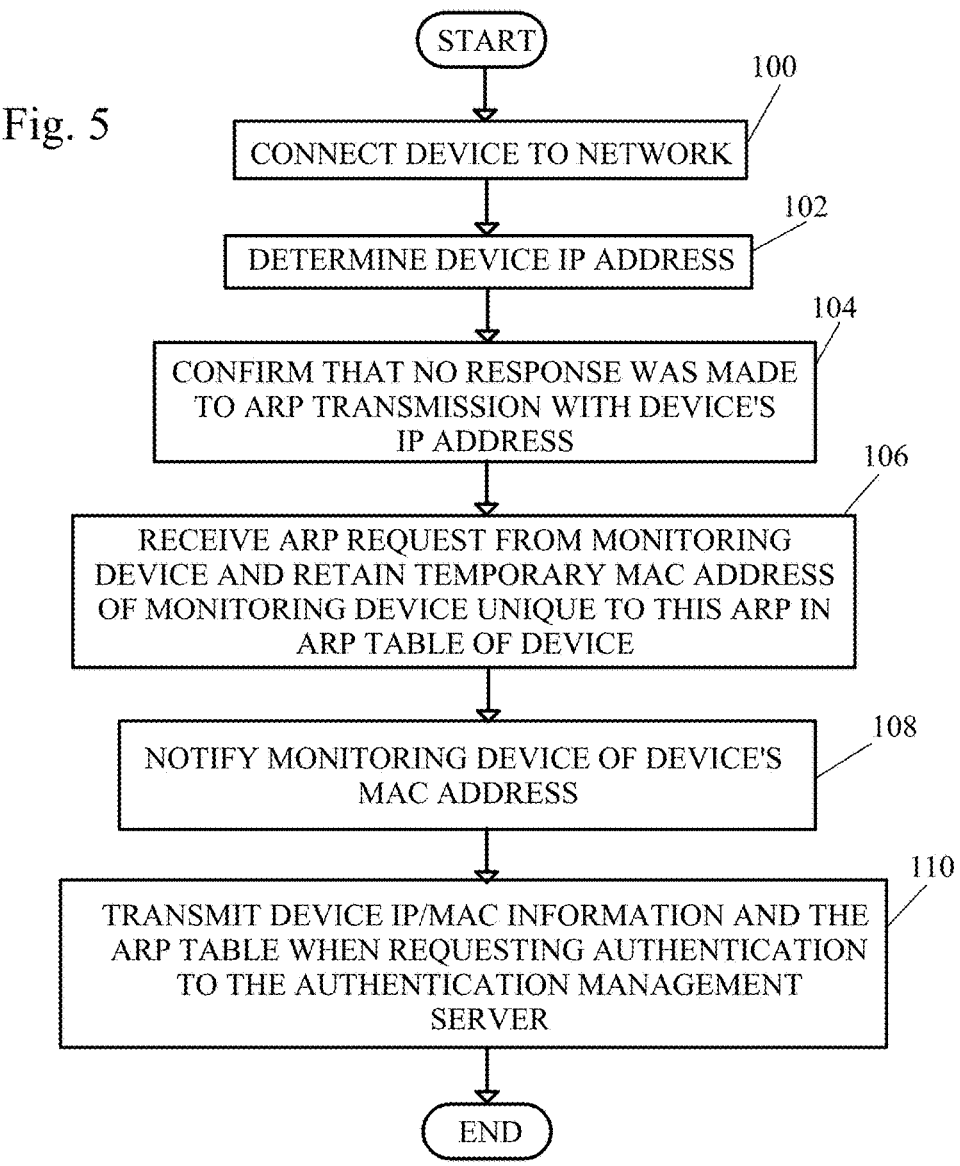
FIG. 5 shows a flow diagram of a method of initializing a client workstation device with the authentication server computer.

FIG. 5 shows a flow diagram of a method of initializing a client workstation device with the authentication server computer.

In a first step, the work station or client device 62a-62n is connected to the network (step 100). At the time of connection, the terminal IP address for the client device 62a-62n is determined (step 102).

The client device 62a-62n then confirms that no response was made to an ARP transmission with the device's IP address (step 104). It should be noted that the device's IP address is used by this specific device only.

The client device 62a-62n then receives an ARP request from a monitoring device 64 on the network and the client device 62a-62n retains the temporary MAC address of the monitoring device 64 unique in this ARP in the ARP table of the client device (step 106).

The client device notifies the monitoring device 64 of the client device's MAC address (step 108). The client device transmits the device's IP/MAC information and the ARP table when requesting authentication to the authentication management server (step 110) and the method ends.

Figure 6A:
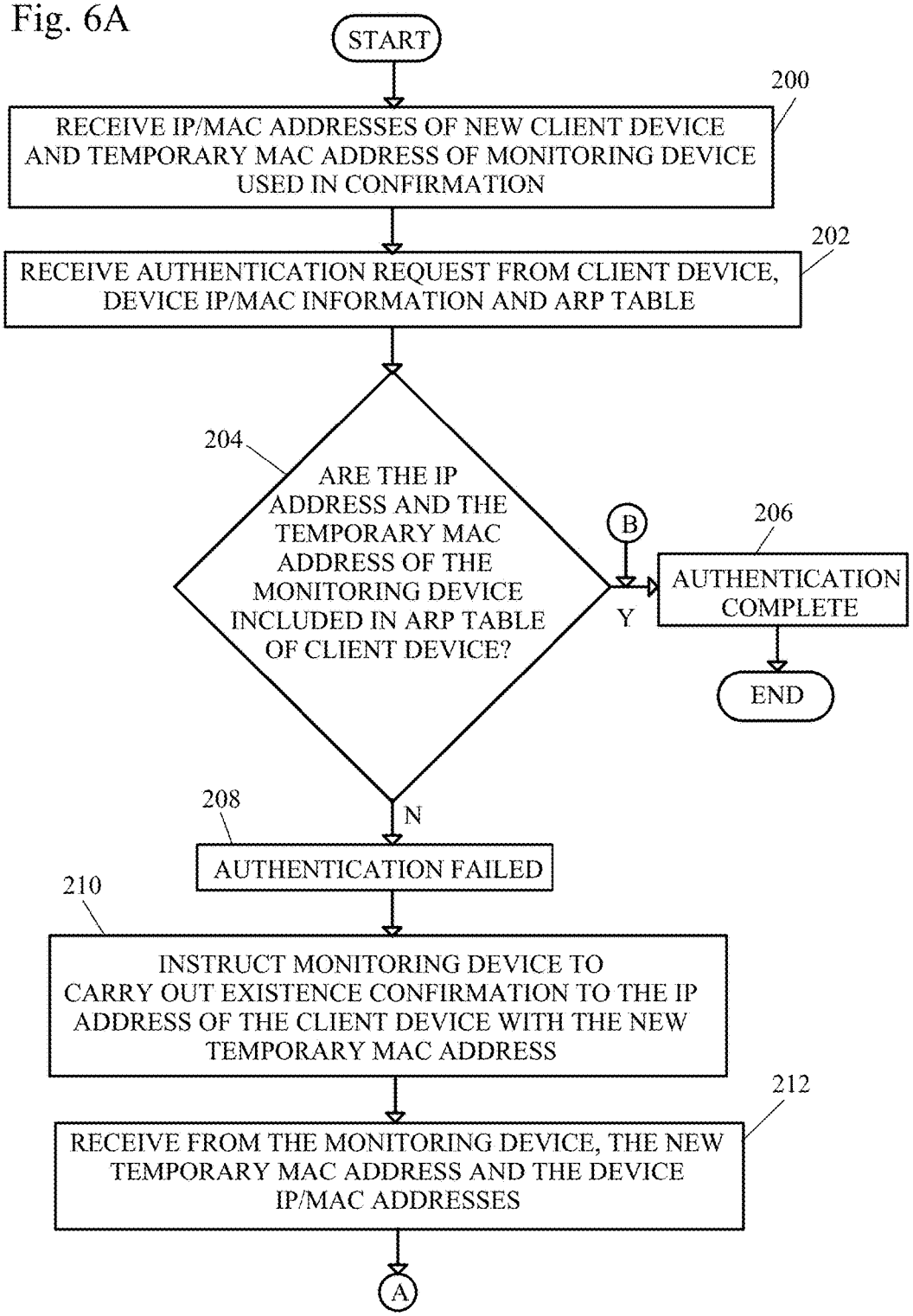
FIGS. 6a-6b show a flow diagram of a method of the authentication management server determining whether the client workstation device is authenticated.
Figure 6B:
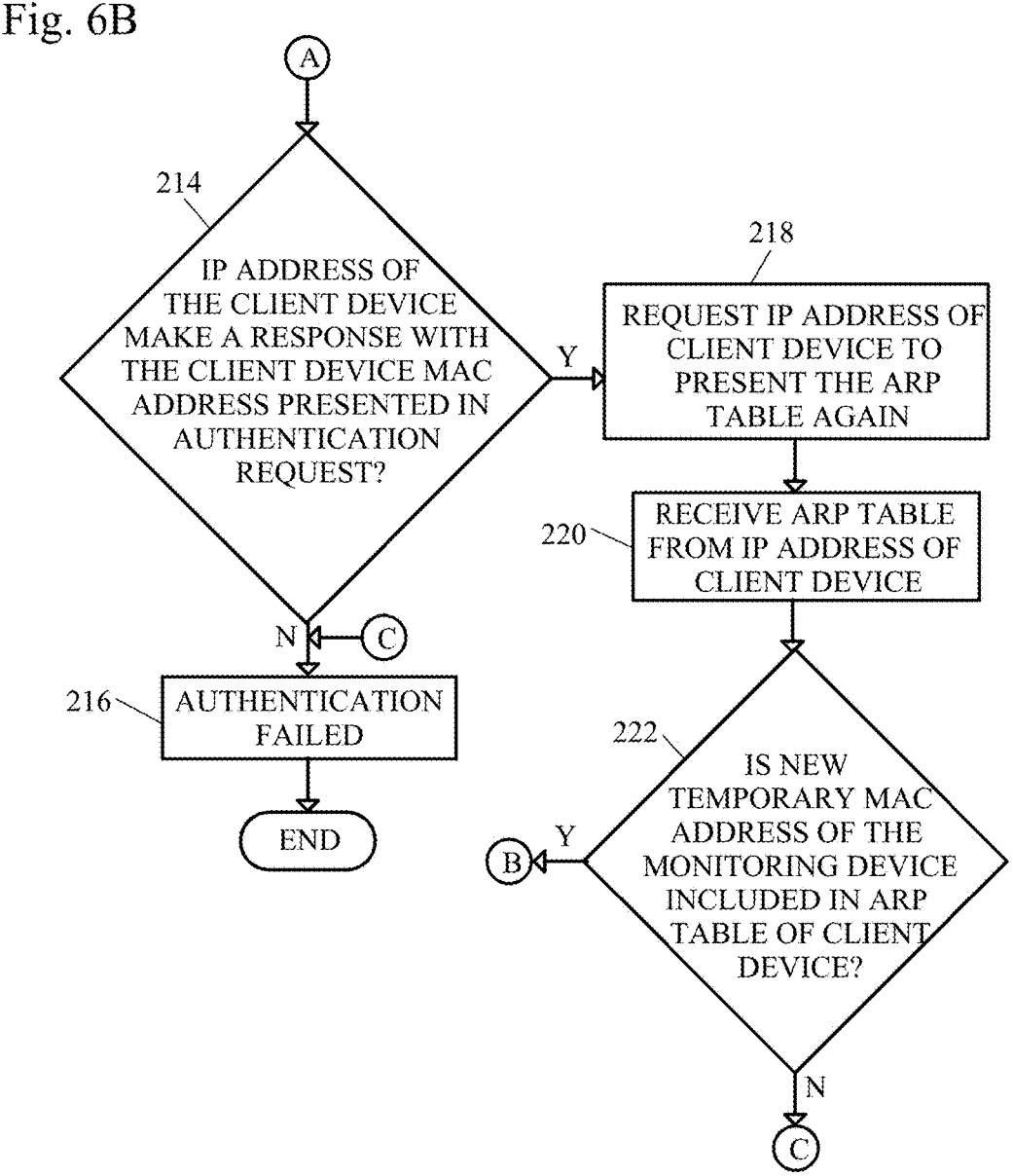

FIGS. 6a-6b show a flow diagram of a method of the authentication management server determining whether the client workstation device is authentic.

The authentication management server 54 receives IP/MAC addresses of a new client device 62a-62n and the temporary MAC address of the monitoring device 64 used in the confirmation (step 200).

The authentication management server 54 receives an authentication request from the client device 62a-62n, the device IP/MAC information and the ARP table (step 202).

If the IP address and the temporary MAC address of the monitoring device 64 are included in the ARP table of the client device 62a-62n (step 204), the authentication is complete and the method ends. A notification or token access to access the target is sent to the client device 62a-62n.

If the IP address and the temporary MAC address of the monitoring device 64 is not included in the ARP table of the client device 62a-62n (step 204), the authentication fails (step 208). The authentication management server 54 instructs the monitoring device 64 to carry out existence confirmation of the IP address of the client device 62a-62n with a new temporary MAC address (step 210).

The authentication management server 54 receives a new temporary MAC address and the client device IP/MAC addresses from the monitoring device (step 212).

If the IP addresses of the client provides a response with the device MAC address that was not presented in the MAC address in the authentication request (step 214), the authentication fails (step 216) and the method ends. A notification regarding the authentication failure may be sent to the client device 62a-62n.

If the IP address of the client device 62a-62n provides a response with the device MAC address that was presented in the MAC address in the authentication request (step 214), the authentication management server requests the IP address of the device 62a-62n to present to the ARP table again (step 218). The authentication management server 54 receives the ARP table from the IP address of the device (step 220).

If the new temporary MAC address of the monitoring device 64 is included in the ARP table of the device (step 222), the authentication server computer authenticates the device (step 206) and the method ends. A notification or token access to access the target is sent to the client device 62a-62n.

If the new temporary MAC address of the monitoring is not included in the ARP table of the device (step 222), the authentication fails (step 216) and the method ends. A notification regarding the authentication failure may be sent to the client device 62a-62n.

FIG. 7 shows a diagram of the requests and responses between the client workstation device, the monitoring device and the authentication server computer at the time of request when the client workstation device is confirmed.

The device 62a-62n requests authentication 320 from the authentication management server 54. The authentication function 152 of the authentication management server 54 identifies 322 the monitoring device 64 based on the IP address and requests ARP confirmation from the monitoring device 64. In turn, the monitoring device 64 sends an ARP request to the device 62a-62n for the device's IP address 324. The transmission source MAC address is request specific. The device 62a-62n receives the ARP request and replies to the monitoring device 64 with the IP/MAC address 326 of the monitoring device 64. The device 62a-62n also adds the IP/MAC address of the monitoring device to an ARP table 329. The monitoring device 64 transmits 328 the request specific MAC address and the device's IP addresses to the authentication function 152 of the authentication management server 54. The authentication function 152 of the authentication management server 54 requests an ARP table from the device 332. The device 62a-62n transmits the ARP table including the IP/MAC addresses of the monitoring device 64 for use 330 in authentication to the authentication function 152 of the authentication management server 54 to confirm the connected to the network 334.

Figure 8B:
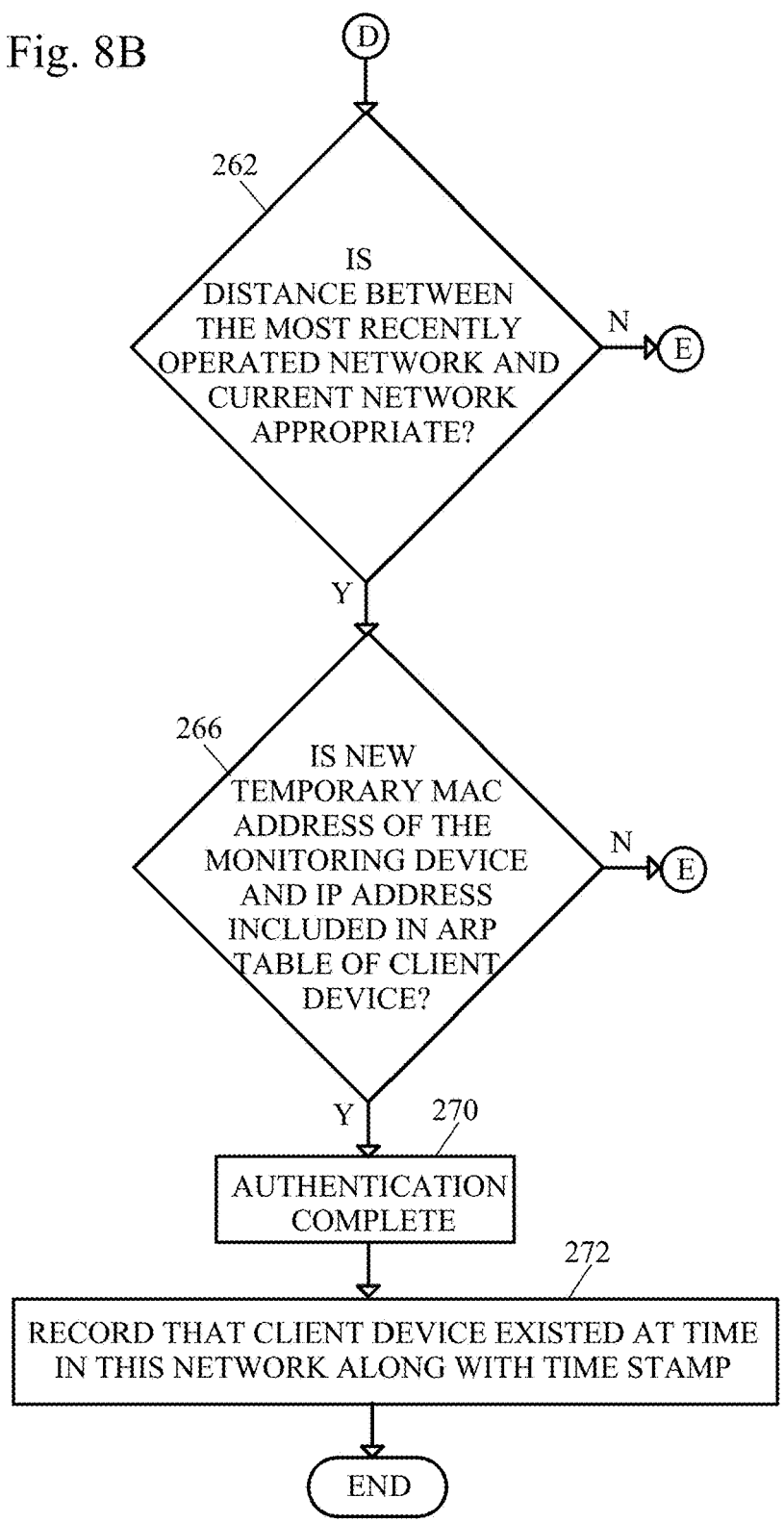

FIGS. 8a-8b show a flow diagram of a method of the authentication management server confirming previous authentication of a client workstation device.

The authentication management server 54 receives the IP/MAC addresses of a new device and a temporary MAC address of the monitoring device 64 used in the confirmation (step 250).

The authentication management server 54 receives an authentication request from the device 62a-62n, the device IP/MAC information and the ARP table (step 252).

The authentication management server confirms a previous authentication request of the device and network information (step 254).

If the distance between the most recently operating network and the current network is not appropriate (step 256), the authentication fails (step 258) and the method ends. The distance is a combination of network distance and access period. For example, if the most recently operated network by a device is in the United States and the current network of the device is Japan, but the access period between the most recent network and the current network is an hour, the access would be denied.

If the distance between the most recently operating network and the current network is appropriate (step 256), the authentication management server 54 requests the most recent monitoring device 64 to carry out confirmation of non-existence of the device 62a-62n (step 260).

If the distance between the most recently operated network and the current network is inappropriate (step 262), the authentication fails (step 258) and the method ends. A notification regarding the authentication failure may be sent to the client device 62a-62n.

If the distance between the most recently operated network and the current network is appropriate (step 262), and the IP address and the temporary MAC address of the monitoring device is not included in the ARP table of the device (step 266), the authentication fails (step 258) and the method ends. A notification regarding the authentication failure may be sent to the client device 62a-62n.

If the distance between the most recently operated network and the current network is appropriate (step 262), and the IP address and the temporary MAC address of the monitoring device is included in the ARP table of the device (step 266), the authentication is complete (step 270). The authentication management server records that the device existed in this network along with a time stamp (step 272) and the method ends. This information is used in determination of the appropriateness of the network movement.

Figure 9:
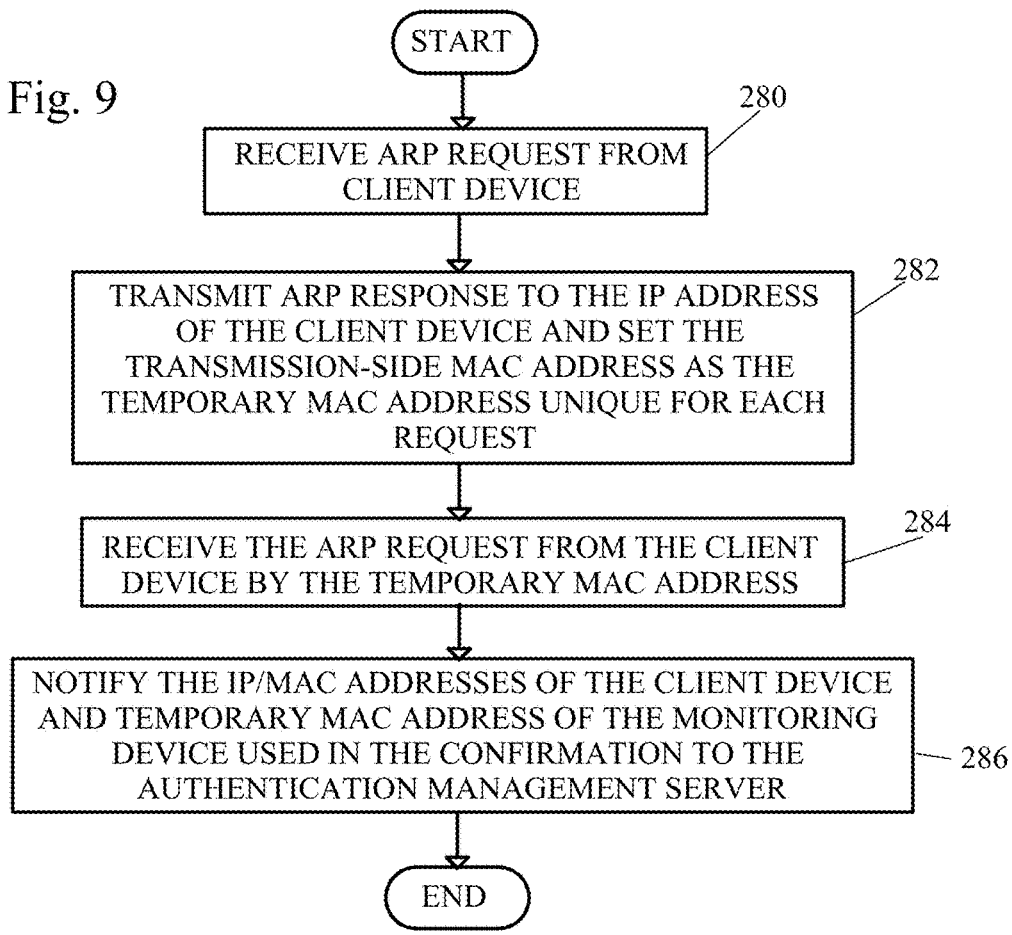
FIG. 9 shows a flow diagram of a monitoring device of network relay information for authentication of the client workstation device of the network.

FIG. 9 shows a flow diagram of a monitoring device of network relay information for authentication of the client workstation device of the network.

The monitoring device 64 receives an ARP request form the device (step 280). The monitoring device 64 transmits the ARP response to the IP address of the client of the device 62a-62n and sets the transmission side MAC address as the temporary MAC address unique for each request (step 282).

The monitoring device 64 receives the ARP request from the device 62a-62n by the temporary MAC address (step 284). The monitoring device 64 notifies the IP/MAC address of the device 62a-62n and the temporary MAC address of the monitoring used in the confirmation to the authentication management server 54 (step 286) and the method ends.

For example, User 1 connects their workstation to Network 1. The workstation determines that its IP address in relation to network 1 is "192.168.0.101" and takes part in Network 1.

At this point, the workstation transmits an ARP request and confirms that the IP address "192.168.0.101" is an unused address.

The monitoring device having the IP address "IP: 192.168.0.2" discovers participation of a new device whose IP address is "192.168.0.101" and issues an ARP request to the device having the IP address "192.168.0.101" with a temporary MAC address "AB34D2-2E7DA6."

User 1's workstation responds to the ARP request from the monitoring device. At the same time, the workstation records, in its own ARP table, the temporary MAC address "AB34D2-2E7DA6" as the MAC address of the monitoring device whose IP address is "IP:192.168.0.2."

An example of the information being stored by User 1's workstation as it relates to authentication is shown in Table 1.

TABLE 1

| User 1 Workstation 1 |
| --- |
| MAC: 010101-010101 |
| IP: 192.168.0.101 |
| ARP Table |
| 192.168.0.1 -0F0F0F-0F0F0F |
| 192.168.02 - AB34D2-2E7DA6 |

The monitoring device having the IP address "IP: 192.168.0.2" receives the MAC address "010101-010101" as the MAC address for the workstation device having the IP address "IP:192.168.0.101," where the MAC address "010101-010101" is received as a response of ARP request above made by the monitoring device to the workstation.

The monitoring device having the IP address "IP: 192.168.0.2" transmits, to the authentication management server, information indicative of the fact of participation of the device having the IP address "IP:192.168.0.101" in the network along with the MAC address "010101-010101" of the workstation device and the temporary MAC address "AB34D2-2E7DA6" that has been used.

An example of the information being stored by the monitoring device of network 1 is shown in Tables 2 and 3 below.

TABLE 2

| Monitoring Device |
| --- |
| MAC: Variable |
| IP: 192.168.0.2 |
| ARP Table |
| 192.168.0.101 -010101-010101 |
| 19.8168.0.102 - 020202-020202 |

TABLE 3

| MAC Variable |
| --- |
| USE MAC: AB34D2-2E7DA6 to IP: 192.68.0.101 |
| USE MAC: 7862F5-AC261E to IP 19.168.0.102 |

The authentication management server retains the content of the information transmitted from the monitoring device as temporary status information in a monitoring device report DB.

An example of the tables being used by the authentication management server are shown below in Tables 4-7. Tables 4-5 corresponds to pre-registered information. Tables 6-7 correspond to status information.

TABLE 4

| Owner WS Database | |
| --- | --- |
| Owner | MAC |
| User 1 (John) | 020202-020202 |
| User 2 (Lisa) | 010101-010102 |
| . . . | . . . |

TABLE 5

| Network DB | | | |
| --- | --- | --- | --- |
| Network | IP Range | Monitoring Device | Location |
| Network 1 | 192.168.1.0/24 | 192.168.1.2 | Xx |
| Network 2 | 192.168.0.0/24 | 192.168.0.2 | yy |
| . . . | . . . | . . . | . . . |

TABLE 6

| | Monitoring Device Report DB | | | | |
| --- | --- | --- | --- | --- | --- |
| Network | Reporting Monitoring Device Temporary MAC Address | Monitoring Device Temporary MAC Address | Client IP Address | Client MAC Address | Report Time Stamp |
| Network 1 | 192.168.1.02 | AB34D2-2E7DA6 | 192.168.0.101 | 010101-010101 | 2016-6-1-13.12.00 |

TABLE 6-continued

Monitoring Device Report DB

| Network | Reporting Monitoring Device Temporary MAC Address | Monitoring Device Temporary MAC Address | Client IP Address | Client MAC Address | Report Time Stamp |
|---|---|---|---|---|---|
| Network 2 | 192.168.0.2 | 7862F5-AC261E | 192.168.0.102 | 020202-020202 | 2016-6-1-14.12.15 |
| ... | ... | ... | ... | | |

TABLE 7

Client Terminal Status DB

| Client MAC Address | Current Client IP address | Current Network | Current Login Name | Client Terminal ARP | Network Participation Time Stamp | Last Access Time Stamp | Last Access Report Server |
|---|---|---|---|---|---|---|---|
| 010101-010101 | 192.168.0.101 | Network 2 | John | 192.168.0.1-0F0F0F-0F0F0F 192.168.02-7862F5.AC261E | 2016-6-1-13.12.00 | 2016-6-1-15.22.00 | 10.8.5.65 Personnel DB |
| 020202-020202 | 192.168.0.102 | Network 2 | Lisa | 192.168.0.1-0F0F0F-0F0F0F 192.168.02-7862F5.AC261E | 2016-6-1-14.12.15 | 2016-6-1-14.23.00 | 10.5.5.10 2 In house Wiki |
| ... | ... | ... | ... | ... | ... | ... | ... |

User 1 (John) logs on from John's workstation (workstation 1) onto the authentication management server.

John's workstation (workstation 1) transmits the login information, its own IP address IP "192.168.0.101," the MAC address "010101-010101," and the ARP table to the authentication management server.

The authentication management server confirms that the MAC address "010101-010101" is an authentic address of User 1 (John), with the confirmation being made based on the information present in the Owner WS Database. The authentication management server additionally confirms the fact that the presented IP address "192.168.0.101" falls within the range of the Network 2, and the fact that the monitoring device of the Network 2 has the IP address "192.168.0.2," with the confirmation being made based on the "Network DB". The authentication management server also confirms the network to which John's workstation having the MAC address "010101-010101" was previously connected, the confirmation being based on the (not shown) client terminal status DB and the authentication management server additionally confirms that the movement from the network to which John's workstation having the MAC address "010101-010101" was previously connected to the Network 2 is consistent in terms of distance and time, with the confirmation being made based on the information of the (not shown) "Network DB".

The authentication management server also directs the monitoring device of the network to which the John's workstation was previously connected to confirm the non-existence of a workstation having the MAC address "010101-010101". The authentication management server confirms the fact that the monitoring device having the IP address "192.168.0.2" of the Network 2 has discovered the device having the IP address "192.168.0.101" and the MAC address is correct, and additionally confirms the device having the temporary MAC address is identical to that in the ARP table of the John's workstation, the confirmation being made based on the "monitoring device report DB".

The authentication management server then permits the authentication and returns an access token to the client workstation and stores the information of this time of authentication in the "Client Terminal Status DB."

John (user 1), for whom the authentication has been permitted, can now access a "Personnel DB" as shown in Table 8 below. John's workstation automatically presents the access token.

The "Personnel DB," on the basis of the access token, confirms the fact that the authentication has been made for the access requester, i.e., John and that he resides on the Network 2; confirms an access control list (ACL), permits access within the range corresponding to the Network 2 of John, and returns the result; and reports to the authentication management server the fact that John made an access request from the Network 2.

TABLE 8

Access Control List

| Target Information | User | Network | Access Permission Range | |
|---|---|---|---|---|
| Personnel DB Payment Table | John | Network 1 | Read | Permitted |
| | | | Update | Permitted |
| | | | Delete | Permitted |
| | | Network 2 | Read | Permitted |
| | | | Update | Denied |
| | | | Delete | Denied |
| | Lisa | Network 1 | Read | Permitted |
| | | | Update | Denied |
| | | | Delete | Denied |
| | | Network 2 | Read | Denied |
| | | | Update | Denied |
| | | | Delete | Denied |
| | ... | ... | ... | ... |

The authentication management server updates the last access information of the "Client Terminal Status DB" on the basis of the report from the "Personnel DB."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of authenticating a client device of a network for access to an access target with an authentication computer comprising the steps of:

the authentication computer receiving a request for authentication from a client device of a network;

the authentication computer identifying a monitoring device on the network of the client device based on an IP address of the client device within the request for authentication;

the authentication computer requesting an address resolution protocol confirmation through the monitoring device with a specific MAC address associated with the address resolution protocol on the network to request the client device's IP address;

the authentication computer receiving, from the client device, the specific MAC address associated with the monitoring device and the client device's IP address and MAC address;

the authentication computer requesting an address resolution protocol table from the client device;

the authentication computer receiving a device address resolution protocol table with IP address and MAC address of the monitoring device;

the authentication computer comparing an established address resolution protocol table of the authentication computer to the device address resolution protocol table, MAC address of the monitoring device, specific request MAC address, IP address of the monitoring device, and IP address of the client device; and the authentication computer granting authentication of the client device when the device address resolution protocol table matches the established address resolution protocol table, the MAC address of the monitoring device, the specific request MAC address, the IP address of the monitoring device and the IP address of the client device.

2. The method of claim 1, wherein the established address resolution protocol table is created by the steps of: the authentication computer receiving a request specific MAC address and the client device's IP address and MAC addresses as received from the monitoring device on the network of the client device.

3. The method of claim 1, further comprising the step of the authentication computer comparing physical distance between a network the client device was previously authenticated in to a current location of a current network to which the client device is connected to determine authentication.

4. The method of claim 3, wherein, if the physical distance is not within a set range, authentication of the client device fails.

5. The method of claim 1, wherein the authentication computer tracks owners of the client devices and associated MAC addresses for each of the devices.

6. The method of claim 1, wherein the authentication computer, through the monitoring device tracks a time stamp of when the client device accessed the network.

7. A computer program product for authenticating a client device of a network for access to an access target with an authentication computer, the authentication computer comprising at least one processor, one or more memories, one or more non-transitory computer readable storage media, the computer program product comprising a computer readable storage medium having program instructions embodied therewith, the program instructions executable by the computer to perform a method comprising:

receiving, by the authentication computer, a request for authentication from a client device of a network;

identifying, by the authentication computer, a monitoring device on the network of the client device based on an IP address of the client device within the request for authentication;

requesting, by the authentication computer, an address resolution protocol confirmation through the monitoring device with a specific MAC address associated with the address resolution protocol on the network to request the client device's IP address;

receiving, by the authentication computer, from the client device, the specific MAC address associated with the monitoring device and the client device's IP address and MAC address;

requesting, by the authentication computer, an address resolution protocol table from the client device;

receiving, by the authentication computer, a device address resolution protocol table with IP address and MAC address of the monitoring device;

comparing, by the authentication computer, an established address resolution protocol table of the authentication computer to the device address resolution protocol table, MAC address of the monitoring device, specific request MAC address, IP address of the monitoring device, and IP address of the client device; and granting, by the authentication computer, authentication of the client device when the device address resolution protocol table matches the established address resolution protocol table, the MAC address of the monitoring device, the specific request MAC address, the IP address of the monitoring device and the IP address of the client device.

8. The computer program product of claim 7, wherein the established address resolution protocol table is created by the program instructions of receiving, by the authentication computer, a request specific MAC address and the client device's IP address and MAC addresses as received from the monitoring device on the network of the client device.

9. The computer program product of claim 7, further comprising the program instructions of comparing, by the authentication computer, physical distance between a network the client device was previously authenticated in to a current location of a current network to which the client device is connected to determine authentication.

10. The computer program product of claim 9, wherein, if the physical distance is not within a set range, authentication of the client device fails.

11. The computer program product of claim 7, wherein the authentication computer tracks owners of the client devices and associated MAC addresses for each of the devices.

12. The computer program product of claim 7, wherein the authentication computer, through the monitoring device tracks a time stamp of when the client device accessed the network.

13. A computer system for authenticating a client device of a network for access to an access target with an authentication computer, the authentication computer comprising at least one processor, one or more memories, one or more computer readable storage media having program instructions executable by the computer to perform the program instructions comprising:

receiving, by the authentication computer, a request for authentication from a client device of a network;

identifying, by the authentication computer, a monitoring device on the network of the client device based on an IP address of the client device within the request for authentication;

requesting, by the authentication computer, an address resolution protocol confirmation through the monitoring device with a specific MAC address associated with the address resolution protocol on the network to request the client device's IP address;

receiving, by the authentication computer, from the client device, the specific MAC address associated with the monitoring device and the client device's IP address and MAC address;

requesting, by the authentication computer, an address resolution protocol table from the client device;

receiving, by the authentication computer, a device address resolution protocol table with IP address and MAC address of the monitoring device;

comparing, by the authentication computer, an established address resolution protocol table of the authentication computer to the device address resolution protocol table, MAC address of the monitoring device, specific request MAC address, IP address of the monitoring device, and IP address of the client device; and granting, by the authentication computer, authentication of the client device when the device address resolution protocol table matches the established address resolution protocol table, the MAC address of the monitoring device, the specific request MAC address, the IP address of the monitoring device and the IP address of the client device.

14. The computer system of claim 13, wherein the established address resolution protocol table is created by the program instructions of receiving, by the authentication computer, a request specific MAC address and the client device's IP address and MAC addresses as received from the monitoring device on the network of the client device.

15. The computer system of claim 13, further comprising the program instructions of comparing, by the authentication computer, physical distance between a network the client device was previously authenticated in to a current location of a current network to which the client device is connected to determine authentication.

16. The computer system of claim 15, wherein, if the physical distance is not within a set range, authentication of the client device fails.

17. The computer system of claim 13, wherein the authentication computer tracks owners of the client devices and associated MAC addresses for each of the devices.

18. The computer system of claim 13, wherein the authentication computer, through the monitoring device tracks a time stamp of when the client device accessed the network.

* * * * *